United States Patent [19]
Huang

[11] Patent Number: 5,161,443
[45] Date of Patent: Nov. 10, 1992

[54] REVOLVING SPEED REGULATING MECHANISM OF CIRCULAR SAWING MACHINE

[76] Inventor: Kin P. Huang, No. 104-1, Alley 156, Lane 38, Ta Kuan Rd., Sec. 1, Panchiao, Tapiei Hsien, Taiwan

[21] Appl. No.: 607,685

[22] Filed: Nov. 1, 1990

[51] Int. Cl.⁵ .................. B23D 45/04; B26D 7/02
[52] U.S. Cl. ........................... 83/169; 83/171; 83/464; 83/490; 83/494
[58] Field of Search .............. 83/490, 168, 169, 171, 83/471.1, 491, 494, 464, 452; 30/388; 74/337.5, 342, 363, 375; 173/48

[56] References Cited

U.S. PATENT DOCUMENTS

| | | | |
|---|---|---|---|
| 1,810,144 | 6/1931 | Oursler | 83/169 |
| 1,969,238 | 8/1934 | Robinson | 83/169 |
| 2,201,658 | 5/1940 | Whitney | 83/169 |
| 2,413,016 | 12/1946 | Wiken et al. | 83/169 |
| 3,500,696 | 3/1970 | Berube | 74/342 |
| 3,672,251 | 6/1972 | Jagers | 83/169 |
| 3,759,124 | 9/1973 | Bashor | 83/490 |
| 4,328,728 | 5/1982 | Ferdinand et al. | 83/490 |
| 4,489,633 | 12/1984 | van de Wouw | 83/490 |
| 4,506,743 | 3/1985 | Grossmann | 173/48 |
| 4,648,301 | 3/1987 | Scott | 83/490 |
| 4,694,720 | 9/1987 | Brickner, Jr. et al. | 83/490 |

Primary Examiner—Frank T. Yost
Attorney, Agent, or Firm—Bacon & Thomas

[57] ABSTRACT

A revolving speed regulating mechanism for a circular sawing machine has a speed regulation rotating handle, a rotary positioning vise and a cooling system. The speed regulation rotating handle is positioned on a housing of the gear box of the circular sawing machine with an actuating rod on its lower end extending into the gear set so as to change gear ratios. The rotary positioning vise is positioned on the base of the machine.

2 Claims, 9 Drawing Sheets

REVOLVING SPEED REGULATING MECHANISM OF CIRCULAR SAWING MACHINE

FIELD OF THE INVENTION

The present invention relates to a mechanism for regulating the revolving speed of circular sawing machine, especially one which is able to change the cutting speed in accordance with the physical property of the material to be machined. The invention includes such a revolving speed regulating mechanism for a circular sawing machine to be cooled and lubricated by cutting oil, as well as an adjustable portion via having replaceable work gripping jaws.

BACKGROUND OF THE INVENTION

Manufacturers of iron grids, aluminum windows, aluminum doors and products made of other materials at present typically use the known circular sawing machine as shown in FIG. 1A to cut the material, such as, plate, piping, etc. at the beginning of the work. In such processes, two types of saw blade are used, one is an emery wheel and the other is made of high speed steel. Both of the saw blades are replaceable in general, but the revolving speed of the motor driving the saw blade is much higher than is accustomed for the purpose of producing sufficient torque to counter-act the corresponding friction forces incurred in the course of cutting, reaching as high as 20,000 RPM. In such circumstances, when using an emery wheel as a saw blade, the higher cutting speed allows faster cutting of the material. But, since the emery wheel is a consumptive tool, particles of the emery wheel would fall off frequently, allowing the wheel to present a sharp cutting surface. The influence of the speed of the circular sawing machine using the emery wheel as saw blade isn't quite obvious, but problems would incur on replacing it with the saw blade of high speed steel material due to the cutting angle $\theta$ provided by the outer shape of the saw teeth at the peripheral edge of the steel saw blade. The cutting speed must be regulated relative to the hardness of the material to be machined, otherwise not only the circular sawing machine would fail to attain its most economical efficiency, but the fast cutting speed generates excessive shock force and temperature. As a result, damage to the saw teeth of the saw blade occurs.

Since the revolving speed of the saw blade of the circular sawing machine being directly driven by a main shaft of a motor is, in general, fixed and unchangeable, the saw teeth of the high speed steel saw blade are usually damaged, resulting in the shortening of the useful life of the blade, by fast speed of cutting of a working piece of harder material. The inventor has determined that the known devices have the following shortcomings (please refer to FIG. 1):

1. The conventional circular sawing machines are unable to change the revolving speed during cutting resulting in the above mentioned inconvenience in use.
2. On cutting the working piece by utilizing extremely high blade speed, the cutting surface of the working piece may be darkened, or even deformed and twisted due to friction heating, requiring the use of cutting oil. However, the use of cutting oil in a conventional sawing machine requires additional manual or mechanical means to supply the oil.
3. The jaw of the positioning vise 104 of a conventional circular sawing machine is unable to be replaced with one having an outer shape to match that of a special working piece, resulting in unstableness or failing to position the working piece appropriately. It is also unable to grip the working piece when cutting at an angle.

SUMMARY OF THE INVENTION

The regulating mechanism of the present invention is able to facilitate the cutting of working pieces with various hardness by providing the appropriate revolving speeds and providing cutting oil for cooling and lubricating the blade to prevent the saw teeth from bearing excessive shock loads or excessive temperatures. It not only attains efficiency of machining to meet economical requirement, but increases the useful life of the saw blade, as well as loads the appearance and the degree of the stability of the material of the finished product.

Another object of the regulating mechanism of the present invention is to allow the circular sawing machine to maintain a specific output of energy in the course of cutting to facilitate relative material adjustment of the torque of the motor shaft and the revolving speed. It is an improvement of the shortcomings of the prior art devices to reduce the rotating torque and the power output incurred in conventional circular sawing machine due to the change of the revolving speed of the motor by means of the adjustment in the electrical circuit.

A further object of the present invention is to provide a stable and fast clamping and positioning of the replaceable jaw of the rotary positioning vise. The tilting angle of the working piece is set via the adjustment of the rotating seat to facilitate the speed and flow of the machining.

A more complete understanding of these and other features and advantages of the present invention will become apparent from a careful consideration of the following detailed description of certain embodiments illustrated in the accompanying drawings.

DETAILED DESCRIPTION OF PREFERRED EMBODIMENTS

Figures 1A, 1D:
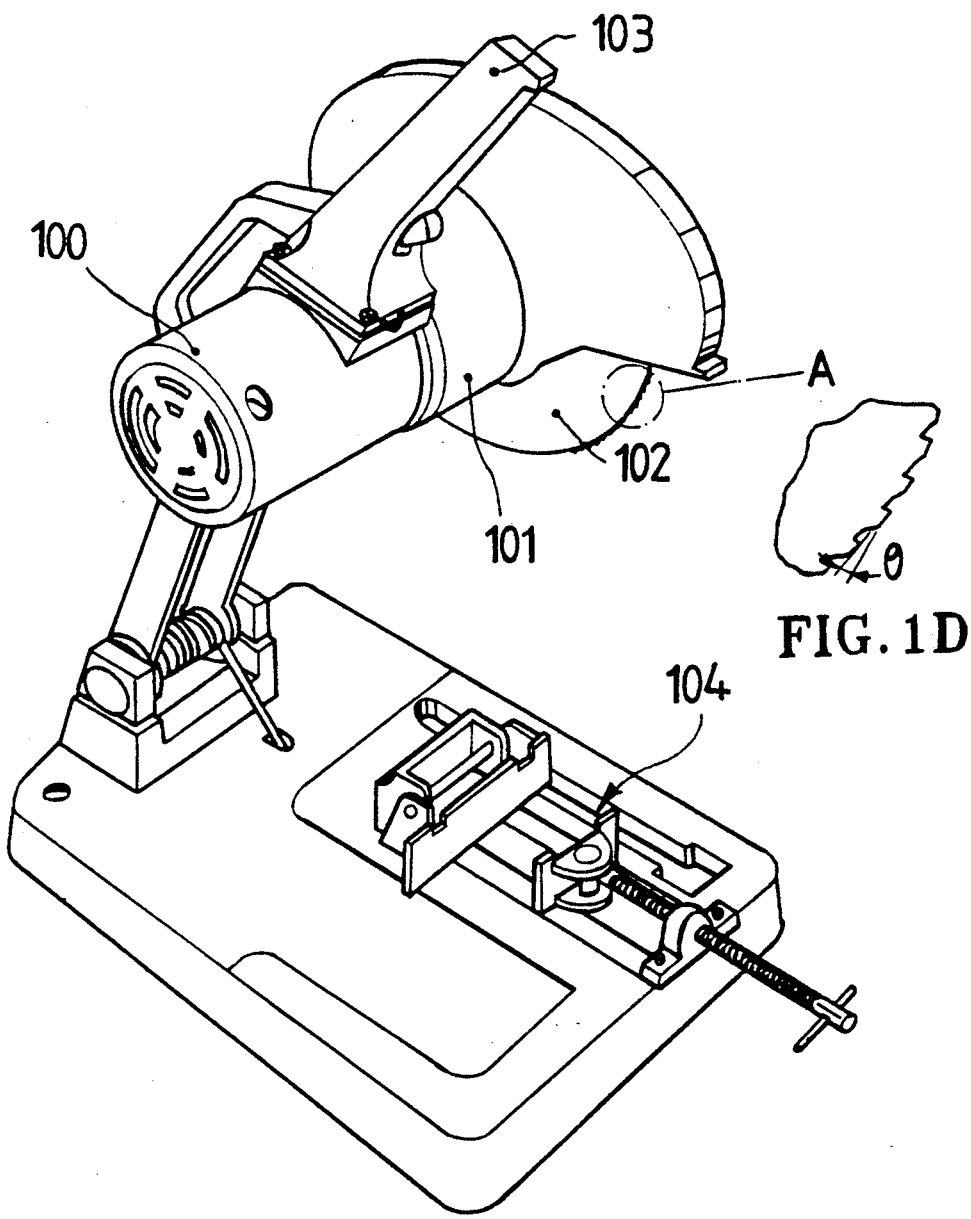
FIG. 1A is a perspective view of a known revolving speed regulation mechanism for circular sawing machine.
FIG. 1D is a enlarged, partial view of the area A in FIG. 1A.

FIG. 1A shows a known circular sawing machine, the shortcomings of which has already been described.

Figure 1B:
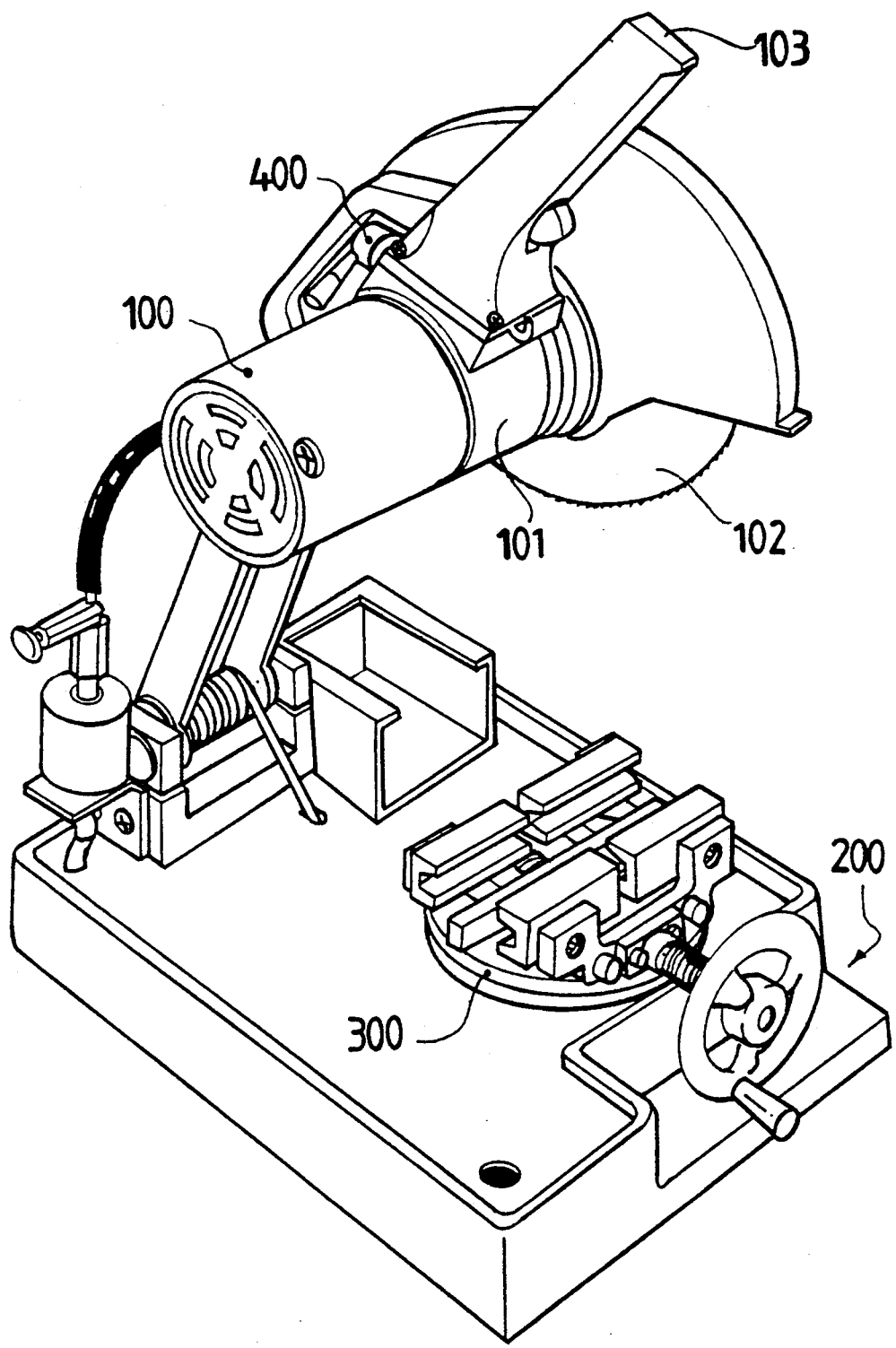
FIG. 1B is a perspective view of a circular saw according to the present invention.

As shown in FIG. 1B, there is a housing 101 at the right side of the body 100 of the circular sawing machine, with a cutting handle 103 and a speed regulating rotary handle body 400 installed on the convex position of the top of the housing 101 to facilitate the change of the driving position of the gear installed inside the housing 101 to regulate the revolving speed of the saw blade. On the circular sawing machine there is a high speed steel saw blade 102 with saw teeth on its edge forming a cutting angle $\theta$. The revolving speed of the saw blade must be regulated according to the hardness of the material of the working piece in order to maximize the working efficiency and prevent the saw blade from being damaged. However, because the current circular sawing machine has only one revolving speed, the cutting speed cannot be regulated and the revolving speed of existing motor is very high. When the circular sawing machine with high speed steel saw blade is used, the cutting of the material depends upon the saw teeth of the saw blade to generate all active force against the machining surface, i.e., the edge of the saw blade cuts into the surface of the working piece to form cutting chips and cause them to fall off the working piece gradually. There would be less friction resistance and the amount of heat generated in cutting would also be less than that generated by an emery wheel. It is suitable for the cutting of aluminum, zinc, bronze, and other materials with low melting points. If the revolving speed were reduced, considerable efficiency of machining would be attained even when cutting harder materials, such as, iron, steel, etc.

Figure 1C:
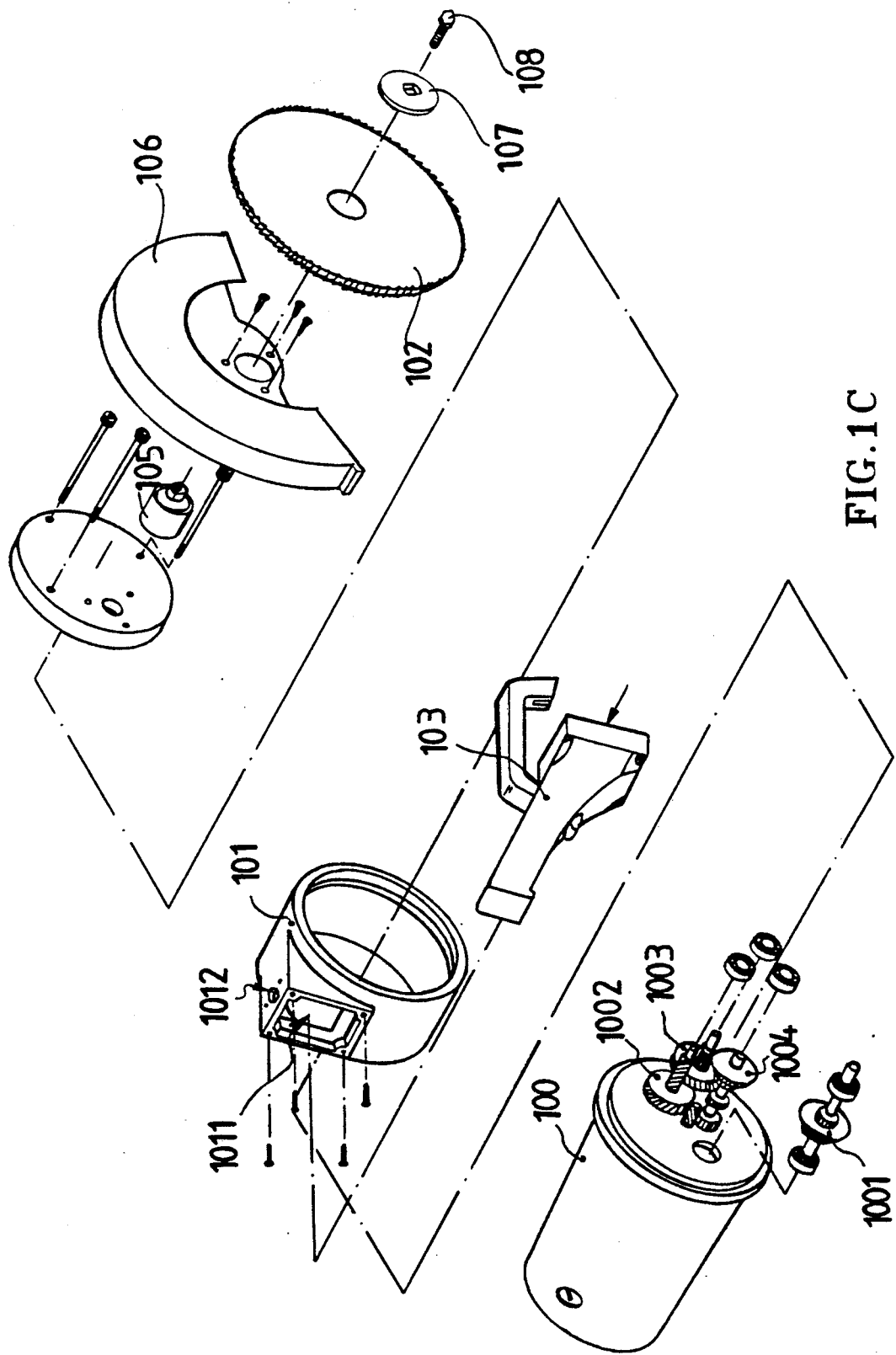
FIG. 1C is a partial, exploded perspective view of the present invention.

As shown in FIG. 1C, the regulation mechanism for the revolving speed of the circular sawing machine of the present invention combines a body 101 with a panel to form a containing chamber at the right side of the body 100 of the circular sawing machine. On the top of the body 101, there are a convex lock seat 1011 and groove 1012 for allowing the body of a speed regulating rotary handle 400 to extend into and be fixed on the body. The chamber formed inside the body 101 contains the revolving speed changing gear sets 1001, 1002, 1003 and 1004. One end of the gear shaft of each gear set is fixed on the cover of the motor, the other end is encased with a rolling bearing and attached to the circular trough of the panel respectfully, wherein the gear shaft of the gear set 1001 extends out of the panel with threads on the outer end for a fixing adapter 105 to be fastened on it. One end of the adapter 105 provides a deep hole with inner threads and a guide post extrudes out of the surface of the other end. The fixing adapter 105 passes through the shield cover 106 to join saw blade 102. A blade clamping force is generated by a washer 107 and a fastening screw 108 on the adapter to compete the blade attachment.

A detailed description of the improvement and the increased mechanism of the present invention can be given as follows.

Figure 2:
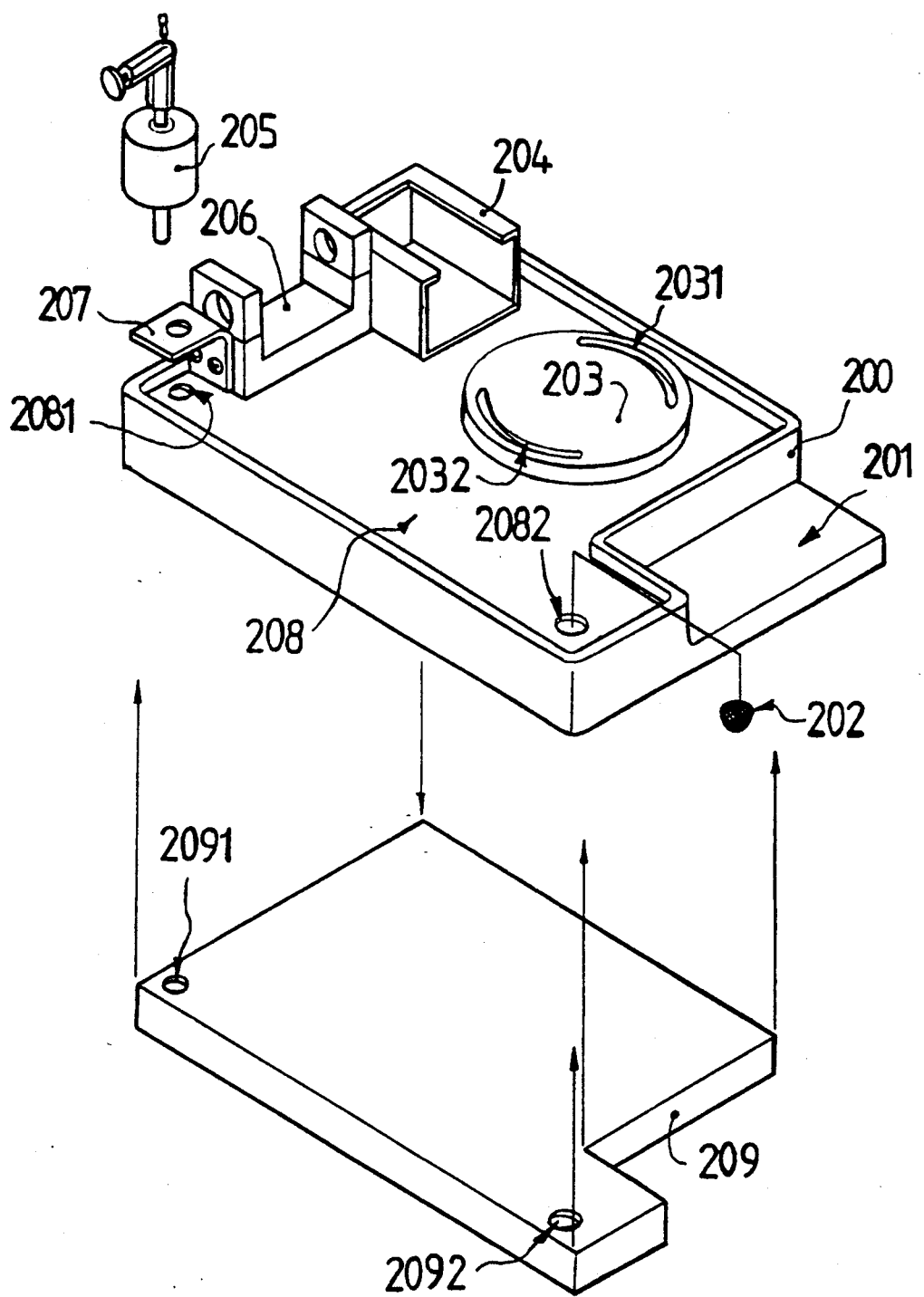
FIG. 2 is a partial, exploded, perspective view of the structure of the cooling system of the present invention.

FIG. 2 shows the cooling system of the present invention installed on the base 200 which has a hollow interior. There is a trough 201 formed at an end of the base 200, and a concave adapting trough 208 is formed on the surface of the body of the base. There is a vise rotary seat 203 at one side of the adapting trough 208 with sliding grooves 2031, 2032 cut into the surface of the rotary seat. There is a blocking box 204 and a seat 206 for mounting the body 100 at the rear of the vise rotary seat 203. The pump seat 207 is then fastened at the side of the body adapting seat 206 for the fixing of the pump 205. There are holes 2081, 2082 formed below the pump 205 and in front of the adapting trough 208 and a filter is inserted into the hole 2082. A cooling liquid box 209 with the size and shape to enable it to be inserted in the base 200 exactly is positioned in the hollow portion of the base 200. Holes 2091, 2092 are located at positions corresponding to the holes 2081, 2082.

Figure 3A:
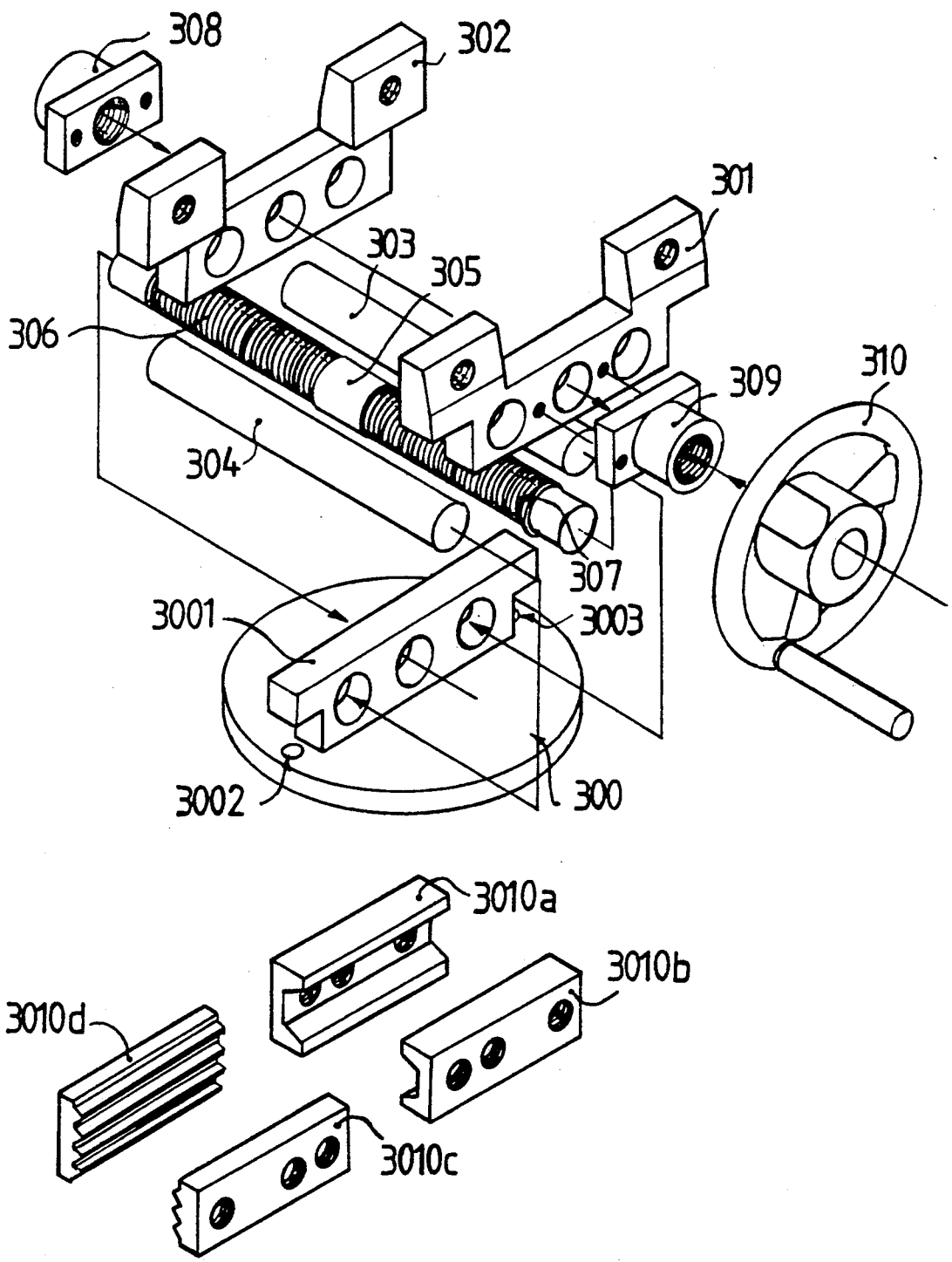
FIG. 3A is a partial, exploded perspective view of the structure of the rotary positioning vise of the present invention.
Figure 3B:
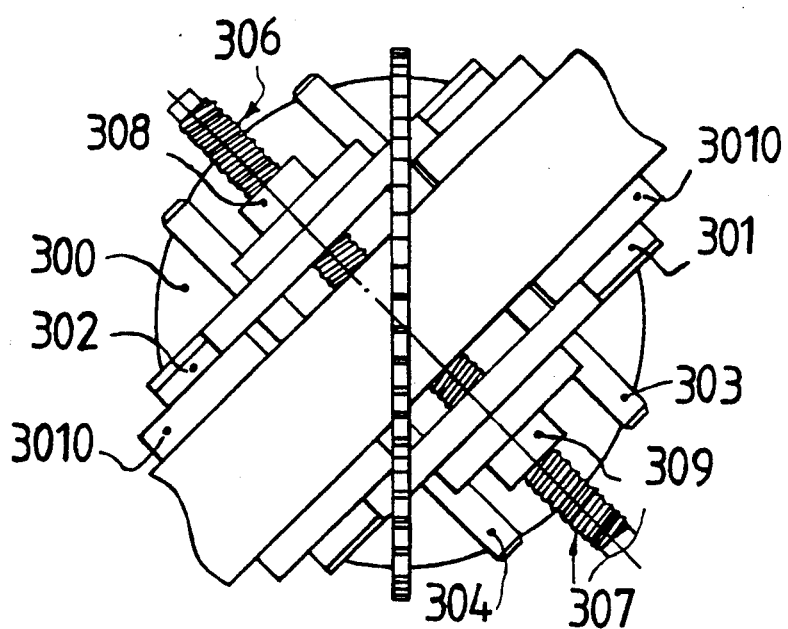
FIG. 3B is a partial top view of the rotary positioning vise.

FIGS. 3A and 3B show a rotary positioning vise with a rectangular supporting seat 3001 above the vise rotary seat 300. Screw holes 3002, 3003, penetrating the vise rotary seat 300 below the two ends of the supporting seat 3001. Three holes are provided on the supporting seat 3001, the two outermost holes are inserted with guide posts 303, 304 respectfully and a screw rod 305 is inserted into the center one. The screw rod 305 is constituted by a left thread 306 and right thread 307 to cause the guide plates 308, 309 to move to drive the clamping plates 301, 302. The inner threads of the guide plates 308, 309 match up with the turning direction of the threads 306, 307. The clamping plates 301, 302 are concave with three holes in the center corresponding with those of the supporting seat 3001 to facilitate the installation of the guide posts 303, 304 and the screw rod 305. Jaws 3010a, 3010b, 3010c and 3010d are replaceably mounted in accordance with the size and shape of the working piece on the convex portion on the sides of the concave clamping plates 301, 302. A rotary handle 310 is attached on one side of the right thread 307 of the screw rod 305 extending out above the trough 201 of the base 200.

Figure 4A:
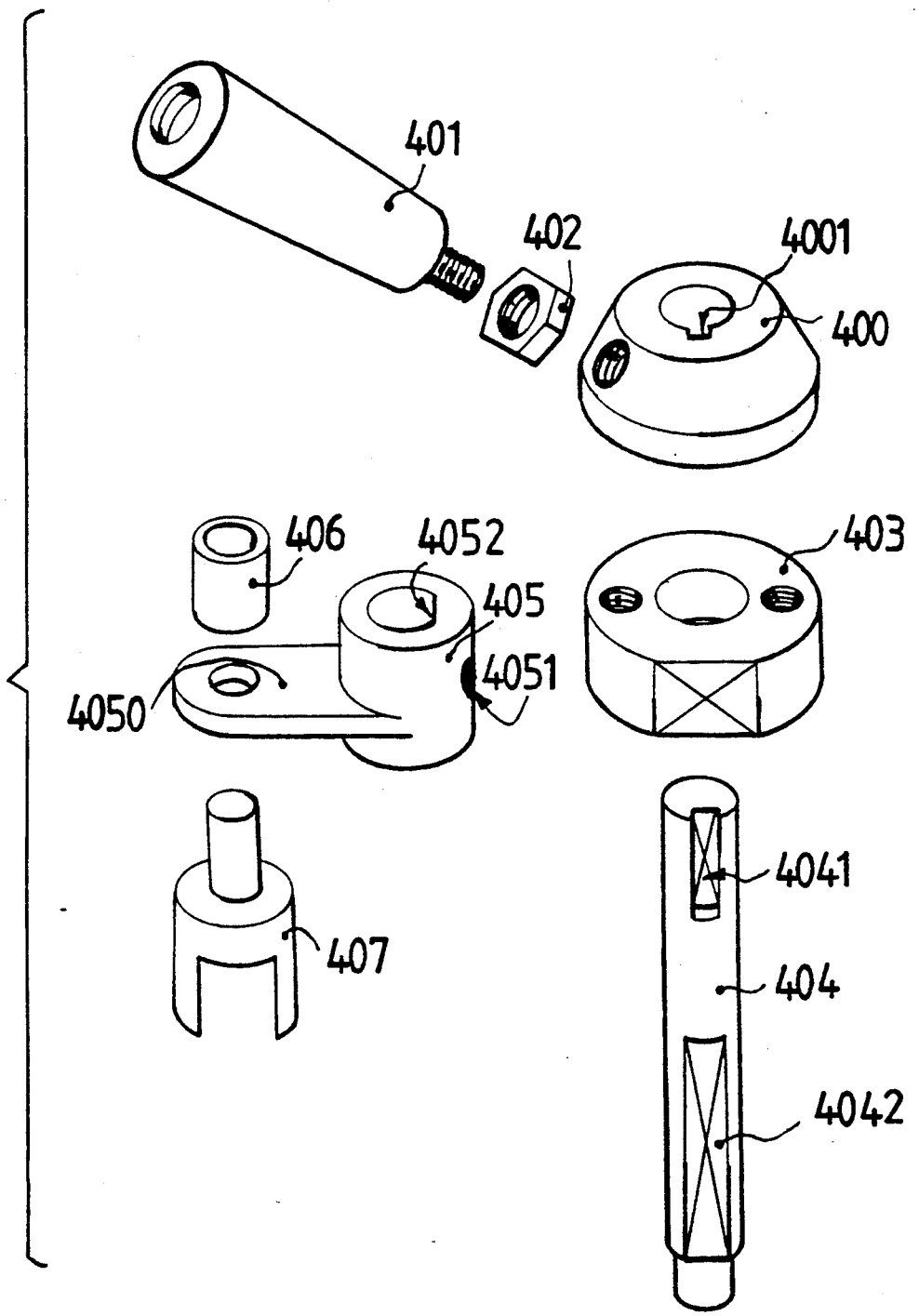
FIG. 4A is a partial, exploded perspective view of the structure of the speed regulating rotary handle of the present invention.
Figure 4B:
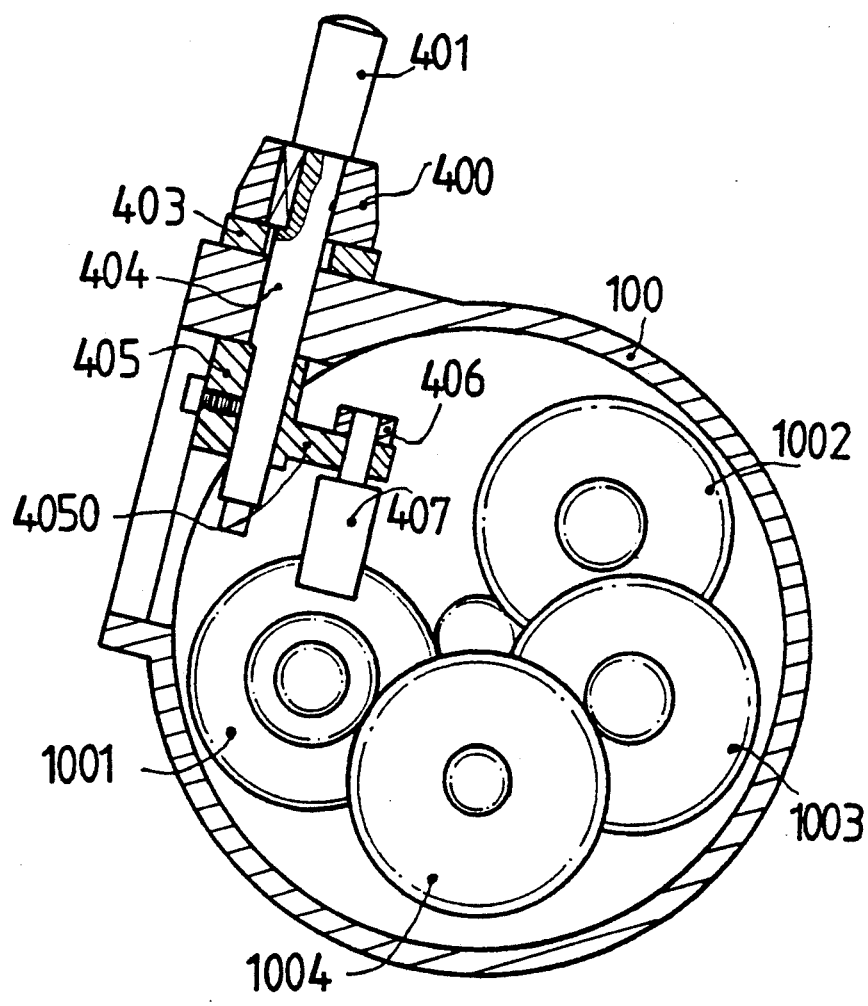
FIG. 4B is a partial, cross-sectional view showing the position of speed regulating rotary handle of the present invention.

FIG. 4A shows the speed regulating rotary handle of the present invention, which is installed inside the trough 1012 above the gear box case 101 (referring to FIG. 1C and FIG. 1B), and comprising a rotary seat 403 fastened outside the trough 1012 having the body of the speed regulating rotary handle 400 seated on it. The upper section of screw rod 404 penetrates the rotary seat 403 and the body of the speed regulating rotary handle 400 to let the key seat 4041 be aligned the key seat 4001 of the body 400. The lower section has a clamping surface 4042 to match the clamping surface 4052 of the rotating block 405 and is fixed by a screw extending through the screw hole 4051. There is an actuating rod 4050 extending outward from one side of the rotating block 405 to engage a rotatable actuating block 407 with its upper portion inserted into a core tube 406.

Figure 4E:
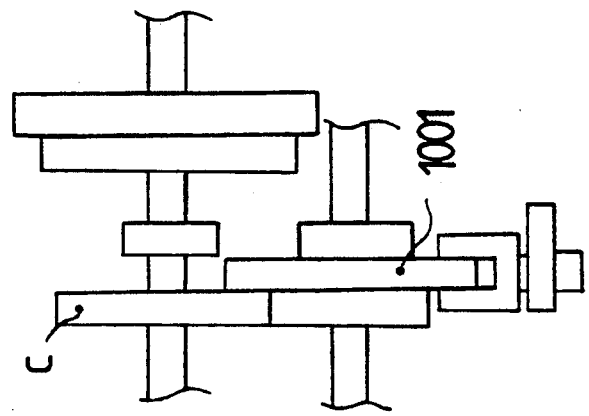
FIG. 4C–4E are schematic illustrations of the speed regulating rotary handle of the present invention.
Figure 4D:
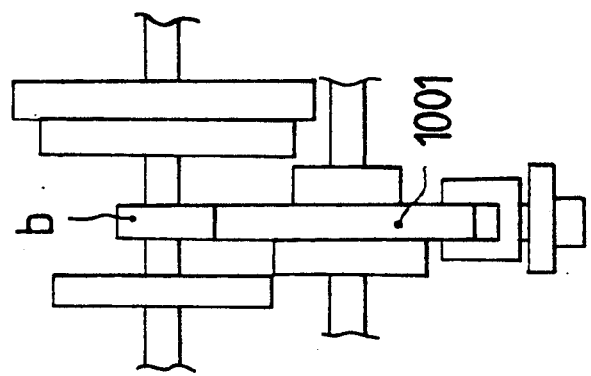
Figure 4C:
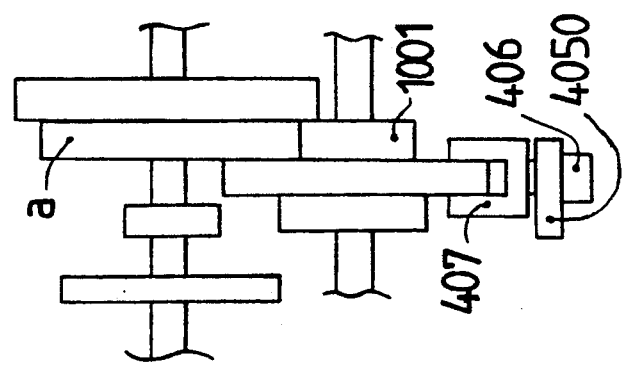

The functions and effects of the present invention are given as follows:

(1) The function of the speed regulating rotary handle is that, it is installed on the body of the gear box 101 connected to the sawing handle 103 (referring to FIG. 1B). while the user presses the sawing handle 103 to perform machining, it is easy to move the rotary handle 401 to regulate the speed. The method of the three stepped sawing blade revolving speed regulation as shown in FIG. 4C-4E is a big improvement over the known circular sawing machine.

(2) The function of the original positioning vise of conventional circular sawing machine is for positioning only. It is unable to complete the clamping of the working piece having a special shape, greatly varying size or required tilting cutting independently and depends upon other fittings or clamping device. The replaceable jaws of the rotary positioning vise of the present invention, 3010a, 3010b, 3010c and 3010d are able to clamp working pieces having different shapes and sizes. Angled cutting may be accomplished by loosening the screw in the screw holes 3002, 3003 below the supporting seat 3001, and turning the rotary seat of the vise 300 45° leftward or rightward in the sliding grooves 2031, 2031. The concave portion in the center of the concave clamping plates 301, 302 provides the saw blade with clearance to perform its cutting travel (referring to FIG. 3B). The appropriate jaw out of the jaws 3010, etc. is selected to match up with the shape and direction of the working piece. As a matter of fact, the rotary positioning vise of the present invention has increased the practicality of the circular sawing machine greatly.

(3) The cutting oil to be provided by the cooling system is pumped out of the cooling liquid box 209 through the holes 2091, 2081 by pump 205 and sent to the delivery tube to be dispensed between the saw blade and working piece following the starting of the circular sawing machine. The blocking box 204 blocks the chips from the working piece from being ejected out along the direction of the cut line of the saw blade. The cutting oil then flows back into the hole 3082 to be collected again, and the chips from the working circumstances, except top provide appropriate lubricating, the cooling system is also able to prevent the working piece from deforming and darkening due to the heat generated by friction. As a result the useful life of the saw blade is lengthened.

I claim:

1. A circular sawing machine having a housing extending from a side of a body of the circular sawing machine, a transmission having a plurality of revolving speed changing gears operatively interposed between a drive motor and a blade of the circular sawing machine, the speed regulating mechanism comprising:
   a) a seat fixedly attached to an exterior of the housing;
   b) a rod rotatably extending through the seat such that the rod has a first end portion extending exteriorly of the housing and a second end portion extending into the housing;
   c) a body member attached to the first end portion of the rod such that rotation of the body member causes rotation of the rod about its longitudinal axis;
   d) a handle attached to the body member;
   e) a block member attached to the second end portion of the rod so as to rotate therewith, the block member having an actuating rod extending therefrom;
   f) an actuating member connected to the actuating rod and operatively associated with the transmission such that rotation of the rod causes rotation of the block member which, in turn, causes movement of the actuating member so as to change the transmission speed to change the speed of rotation of the cutting blade; and,
   g) a work holding vise comprising:
      i) a machine base;
      ii) a vise seat pivotally attached to the machine base;
      iii) a supporting seat located on the vise seat;
      iv) guide members extending through the supporting seat;
      v) clamping plates slidably mounted on the guide members and located on either side of the supporting seat;
      vi) a screw rod rotatably supported on the supporting seat and threadingly engaging the clamping plates such that rotation of the screw rod in a first direction causes the clamping plates to move toward each other and rotation of the screw rod in a second, opposite direction causes the clamping plates to move away from each other;
      vii) a second handle attached to the screw rod so as to rotate therewith; and,
      viii) jaw members removably attached to the clamping plates adapted to grip a workpiece therebetween.

2. The circular sawing machine of claim 1 further including a cooling system comprising:
   a) a hollow machine base defining a cavity, a cooling liquid inlet, a cooling liquid outlet and a trough for collecting used cooling fluid;
   b) a cooling liquid container disposed in the cavity defined by the machine base, the cooling liquid container defining holes aligned with the cooling liquid inlet and outlet;
   c) pump means attached to the machine base to pump liquid from the liquid container onto the cutting blade;
   d) filter means in the cooling liquid outlet; and,
   e) a blocking box mounted on the base and located so as to direct cooling fluid and chips cut from a workpiece onto the trough.

* * * * *